United States Patent [19]
Garcia

[11] Patent Number: 5,414,826
[45] Date of Patent: May 9, 1995

[54] SYSTEM AND METHOD FOR MEMORY MANAGEMENT IN MICROCOMPUTER

[75] Inventor: Philip Garcia, Stanford, Calif.

[73] Assignee: Hewlett-Packard Company, Palo Alto, Calif.

[21] Appl. No.: 472,055

[22] Filed: Jan. 31, 1990

[51] Int. Cl.$^6$ .............. G06F 13/00; G06F 12/02
[52] U.S. Cl. .................. 395/425; 364/244; 364/244.3; 364/246.2; 364/DIG. 1; 395/600
[58] Field of Search ............................. 364/200

[56] References Cited

U.S. PATENT DOCUMENTS

| | | | |
|---|---|---|---|
| 3,924,245 | 12/1975 | Eaton et al. | 395/400 |
| 4,511,964 | 4/1985 | Georg et al. | 364/200 |
| 4,757,438 | 7/1988 | Thatte et al. | 364/200 |
| 4,914,577 | 4/1990 | Stewart et al. | 364/200 |
| 4,989,137 | 1/1991 | Oxley et al. | 364/200 |
| 5,226,155 | 7/1993 | Iijima | 395/600 |

FOREIGN PATENT DOCUMENTS 2635886 8/1989 France .............. G06F 12/02

OTHER PUBLICATIONS

A. Shubat, et al. "Mappable Peripheral Memory for High Speed Applications", VLSI and Computer Peripherals, Conf. 3, No. 1, 1989, Washington, IEEE Comp., pp. 56-58.
T. Standish, *Data Structure Techniques*, 1980, pp. 132-133 and 186-188.

*Primary Examiner*—Kevin A. Kriess
*Assistant Examiner*—John Q. Chavis

[57] ABSTRACT

A system and method for managing memory in a microcomputer dynamically allocates a pointer table of varying length at one end of a data memory area, and similarly allocates a data field, which includes data blocks, at the other end of the data memory area. Data pointers within the pointer table point to the memory locations of the data blocks. As data blocks are added, the data field and the pointer table grow towards each other.

8 Claims, 3 Drawing Sheets

SYSTEM AND METHOD FOR MEMORY MANAGEMENT IN MICROCOMPUTER

BACKGROUND OF THE INVENTION

1. Field Of The Invention

The present invention is a system and method for the efficient allocation and access of memory in a microcomputer.

2. Related Art

In any modern computer system, management methods for storing data play a key role in the efficient operation of the computer. Because the computer systems are becoming more complex, memory management schemes are becoming more and more important. Both the speed of accessing the data, as well as the efficient use of available memory, are critical factors to be considered when developing such schemes.

In situations where the number and size of individual data entries is unknown, a versatile memory management scheme allows the computer system to most wisely utilize precious memory. This is particularly true with schemes involving data acquisition. An example of such a scheme is a computer program which can record the purchases made in a store. A user could enter data into the program for each item bought, the name of the item, the name of the customer, and also a number of optional items such as credit card number which may or may not be filled out. Note that the size and number of data entries could not be determined beforehand. It would be wasteful to allocate a large amount of memory for each potential entry prior to entering the data, and where optional fields are not used, it would be wasteful to allocate any memory at all. Once the data has been entered, it is also of vital importance that the data can be retrieved quickly.

In finding a solution to this memory management problem, several different scheme have been devised in order to efficiently manage memory. Two conventional scheme exist, one involving the use of a table, and the other involving the use of a linked list.

The table scheme for managing memory involves the allocation of two fixed areas which are to be a pointer table and a data area. Prior to the storage of data, a fixed amount of memory is allocated by a memory management routine for use by the pointer table and data area. When memory is required for the storage of data, the data is written at the next available block of memory, and a pointer within the pointer table is given the address of this block of data. The address for what is to be the subsequent block of data is then calculated, and retained. When a request for a particular data block occurs, all that is needed is a search of the pointer table in order to find the address of the data block requested.

The problem with using the table, however, is that the pointer table and the data area need to be allocated prior to storing any data. Therefore, some fixed number of pointers and fixed number of space for the data area must be allocated. This means that if you have allocated, for example, space for 100 pointers, and it turns out that more than 100 data blocks need to be stored, there will not be enough pointers. A problem also occurs if only a few very large data blocks are allocated. In that case, only a few pointers will be used, and the memory in which the remaining unused pointers are stored will be wasted.

Another conventional scheme of memory allocation which allocates memory more efficiently than a table is known as a linked list. In this scheme, rather than having a table for keeping pointers for each data block, a designated portion of each allocated data block is used as a pointer to the next block of data to be used. Thus, a pointer is only allocated when a new data block is created. As an example of this methodology, if there are two blocks of data which have been allocated, the first block has a pointer which points to the second block allocated. If the second block was the last data block to be allocated, then the pointer in that data block points to the next available data memory location. In this way, a software program can follow the link of blocks of data until the desired block is obtained.

The disadvantage of the linked list scheme, however, is that it takes a long time to find the block of data which is desired. For example, if the desired block is at the end of a long linked list of data blocks, then the software application searching for that block of data must traverse the entire length of the linked list before it obtains the desired data.

In summary, both conventional memory allocation schemes (table and linked list) have deficiencies. Table requires pointers and wastes memory space, whereas linked list is more memory efficient but data retrieval is often slower.

Thus, what the inventor realized was needed is a memory management scheme which can efficiently allocate memory (in terms of space) as is the case in a linked list, and also has the ability to quickly find desired blocks of data, as is the case with a table.

SUMMARY OF THE INVENTION

The deficiencies of the above-noted conventional schemes led the inventor to invent a system and method for managing memory on a microcomputer, in which memory is allocated with the efficiency of a linked list, and data is retrieved with the speed of a table.

During the operation of the present invention, a pointer table is dynamically allocated beginning at one end of a given data memory area. The pointers within this pointer table each point to an allocated data block, or to the location of the next available data memory location.

The pointer which points to the next available data memory location initially points to the other end of the data memory area from which the pointer table has been allocated. As data blocks are written to the data memory area, the pointer table and data blocks grow toward each other, and can continue to do so until their continued growth would otherwise cause them to overlap with each other.

When a request for the writing of a data block into the data memory area occurs, the present invention obtains from the pointer table the pointer which points to the next available data memory location, and checks to insure that the writing of the data block will not cause the data block and the pointer table to overlap. If there will be no overlap, the data block is written. After that, a new pointer will be allocated containing the location of where the next data block is to be written. This location is the next available data memory location, and is adjacent to the data block previously written.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENT

The present invention is a system and method for the efficient allocation and access of memory in a microcomputer. More specifically, the present invention is a memory allocation routine for efficiently managing memory on a microcomputer 100 (shown in FIG. 1) or controller by permitting efficient allocation of memory and allowing for quick retrieval of data stored therein.

Figure 1:
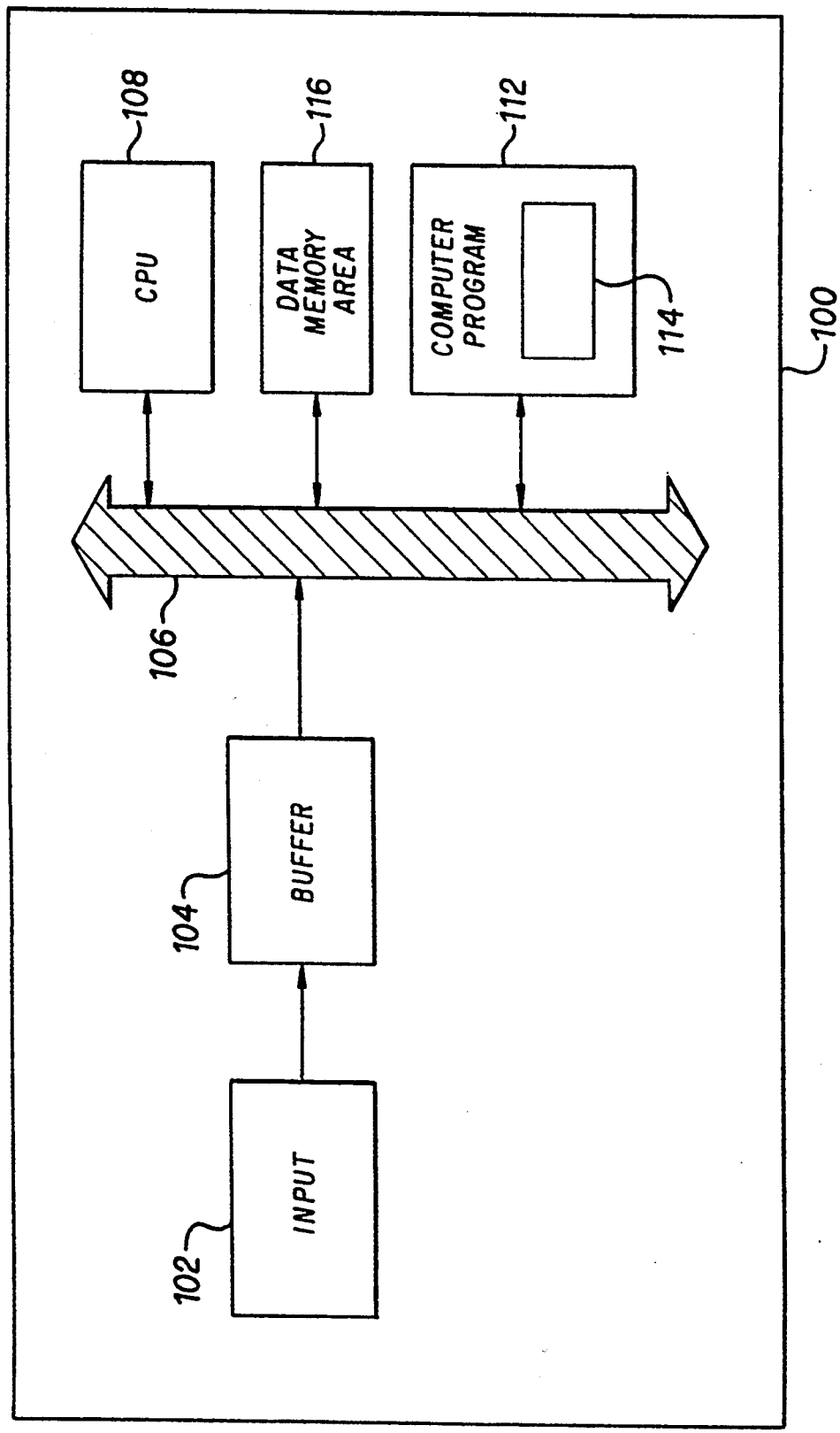
FIG. 1 is a high-level diagram of the environment of the present invention.

In a preferred embodiment, the present invention generally runs in the computer environment as shown by FIG. 1. As can be seen from FIG. 1, the present invention (which in one embodiment is a memory allocation routine 114) is preferably part of a larger computer program 112. This computer program 112 can be a standard software application, or it could be a part of the operating system or BIOS of the microcomputer 100.

The way in which memory allocation routine 114 interacts with its computer environment can be best seen from the following example. If a user is interacting with the computer program 112, the user enters data from an input device 102. The data is then sent to a buffer 104, which stores it. A central processing unit (CPU) 108 is alerted that there is data to be read from the buffer, and reads this data. The memory allocation routine 114, allocates space within a data memory area 116 and directs the CPU 108 to send the data via a bus 106 to the data memory area 116. In this way, the memory allocation routine 114 is actually initiated by the input of data from a user via an input device 102. Of course, a computer program 112 could also be written to automatically generate data which would then be stored by the memory allocation routine 114, or some combination of the above.

The present invention is contemplated for use in a computer system where it is not known how many different sized blocks of data are to be requested, and where speed of access to the data is important. Consequently, the present invention is now described with regard to FIG. 2.

Figure 2:
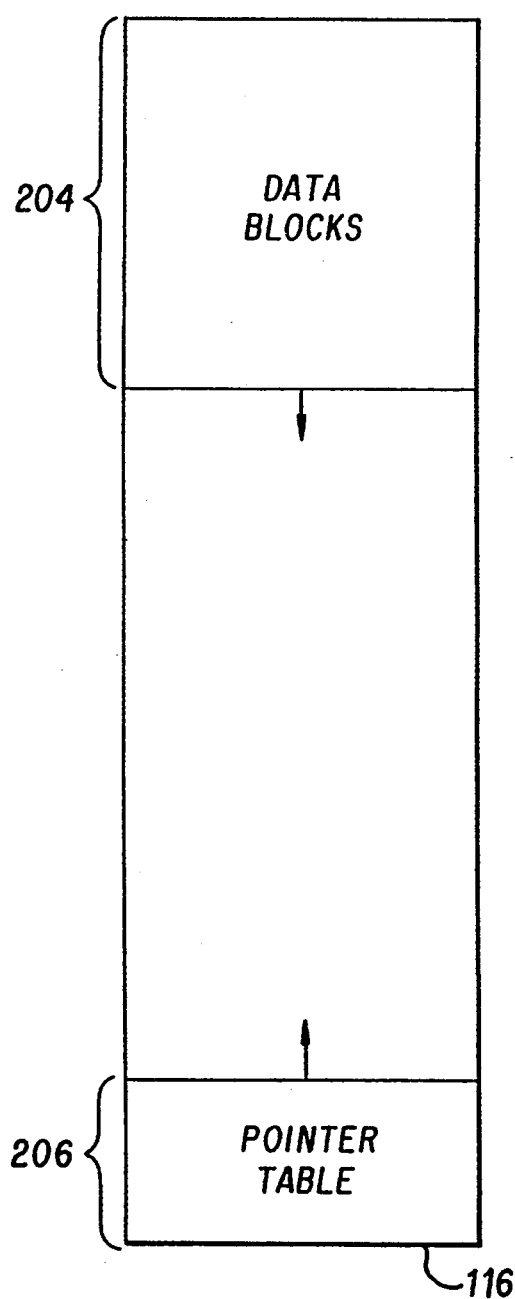
FIG. 2 is a high-level diagram of a memory configuration generated by the present invention.

FIG. 2 diagrammatically shows a data memory area 116 which is to be used for the storage of data. This data memory area 116 can be the entire free memory within the microcomputer 100 (shown in FIG. 1), or it can be a smaller portion thereof. In fact, several data memory areas 116 can be set up and utilized at one time.

In general, a pointer table 206 is allocated beginning at one end of the data memory area 116 by the memory allocation routine 114. This pointer table 206 contains pointers which point to data blocks within a data field 204. These data blocks are allocated beginning at the other end of the data memory area 116 from the pointer table. The variable length portion of data memory area 116 in which the data blocks are stored is referred to herein as a data field 204. Thus, it can be seen that the data field 204 and pointer table 206 grow towards each other as new entries are added.

Whenever a new data block is allocated within the data field 204 by the memory allocation routine 114, a new pointer in pointer table 206 is also allocated. The contents of this new pointer point to the address of the beginning of where in available memory the next data block will go (that is, it points to the next available data memory location). Thus, each pointer in pointer table 206 and each data block is dynamically allocated. Therefore, it is unnecessary to specifically allocate any memory for the pointer table 206 or for a data field 204 in advance.

The above-noted memory management scheme provides for significant flexibility in that it can efficiently handle data regardless of how it is entered. For example, it may be the case that all of the data blocks are of a minimum size, but there are a very large number of them. This creates one pointer for each data block. In such a case, the present invention allows for pointers to be allocated until the data memory area 116 is completely filled (that is, the pointer table would otherwise overlap with the data field). In fact since it is possible for data blocks to have no data in them (and be empty as described below), a pointer table can effectively consume the entire data memory area 116.

Similarly, if only one data block is to be allocated which takes up nearly all of the data memory area 116, this is also possible. In both cases, no memory is wasted, and a search for any data block can be found quickly. Thus, the present invention can locate a data block as quickly as a standard table scheme, and is as space efficient as a linked list.

Figure 3:
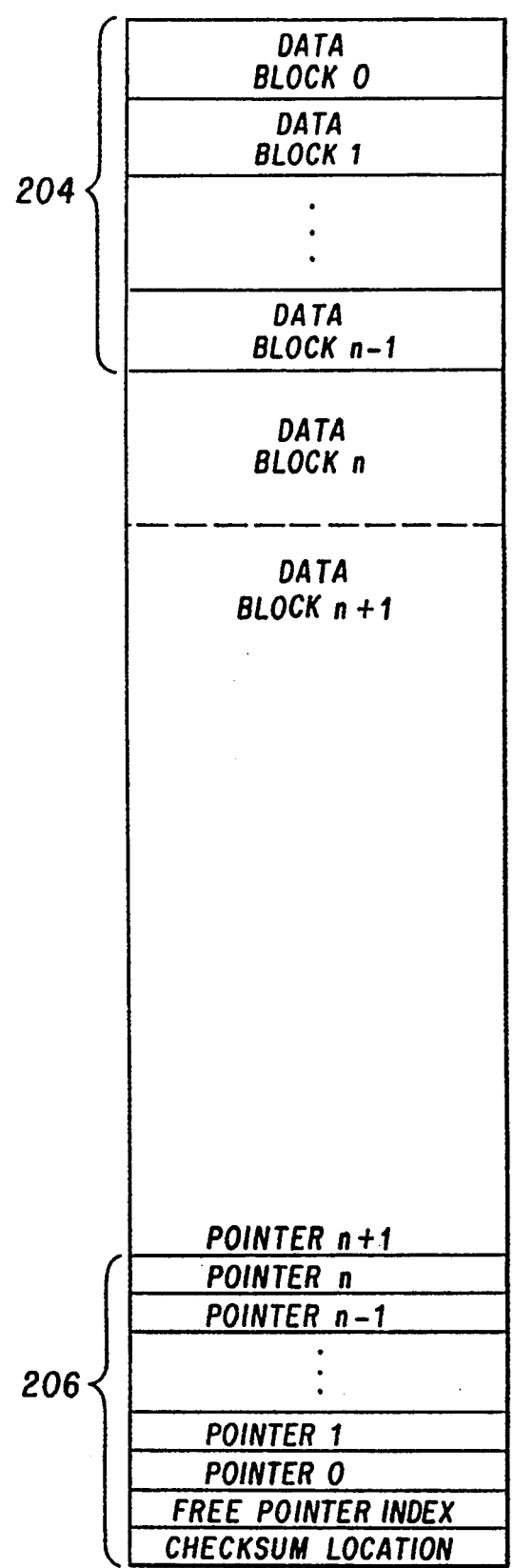
FIG. 3 is a lower-level diagram of a memory configuration generated by the present invention.

A more detailed description of the present invention is now described with regard to FIG. 3. Before allocating a data block, the present invention first reads a memory address contained in a free pointer index. This memory address points to the next available pointer to be used (which was set up in a previous data block allocation).

The present invention then reads the contents of this next available pointer, shown as "pointer n" in FIG. 3. Pointer n contains the address of the next free data block (data block n). A check is then done to determine if allocating the new data block and a new pointer would result in the data field 204 overlapping the pointer table 206. If there is not enough data memory area 116 left for the creation of the new data block and pointer, then an error message results. If there is enough area left, a data block is created having a memory address beginning at data block n.

When the data block has been completely written, the address of what would be the beginning of a subsequent data block (shown as data block n+1) is obtained. This address is then placed into the next available pointer location (pointer n+1), and the free pointer index is updated to point to pointer n+1. If the data block is an empty data block (the situation for which is described below), then the address of the beginning of the next data block does not need to be updated.

A preferred embodiment of the present invention is now described with reference to a specific example of its use.

Figure 4:
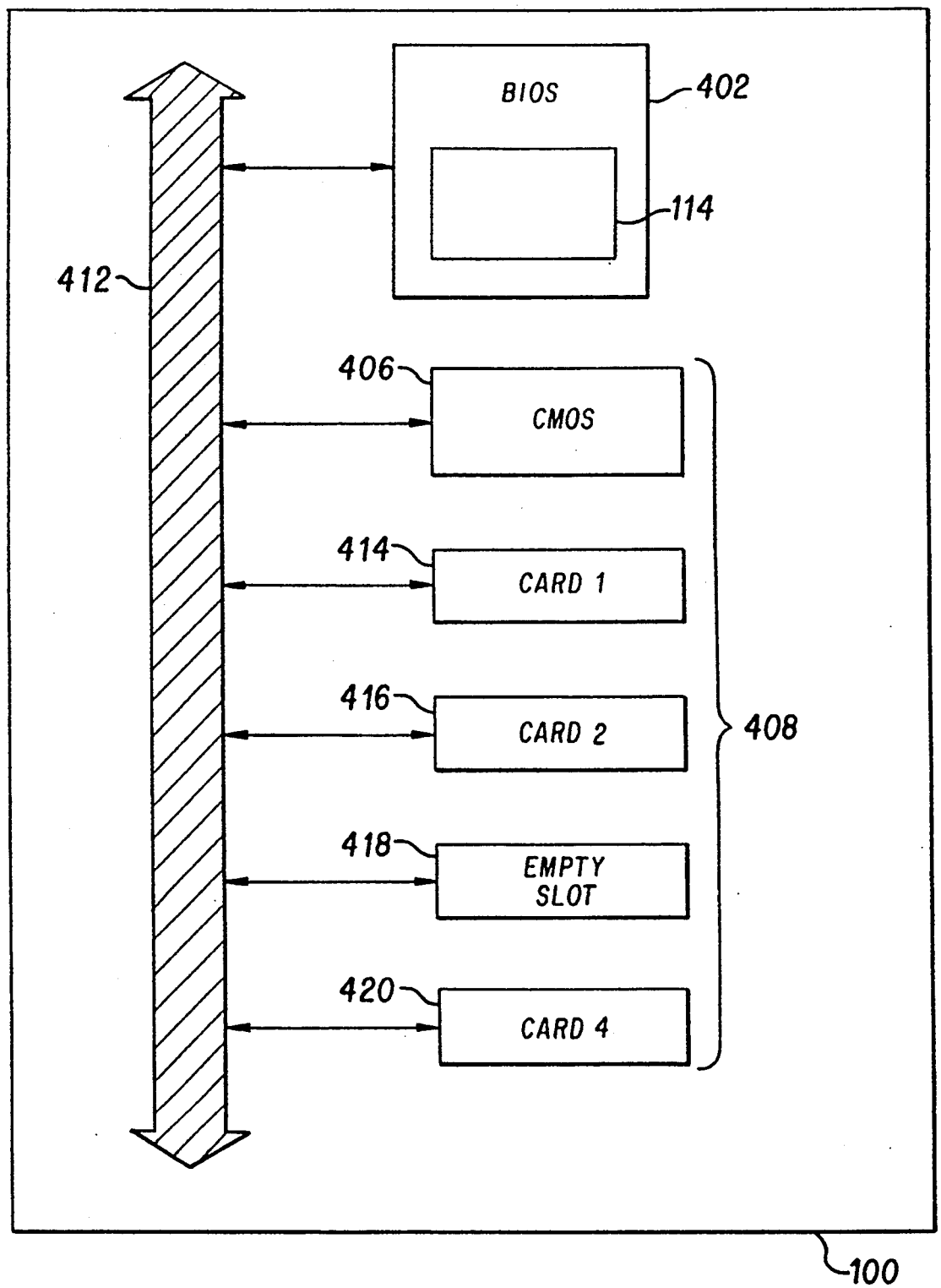
FIG. 4 is a preferred embodiment of the environment of the present invention.

In the past, configuration settings on microcomputers had to be manually set by toggling configuration switches inside of the microcomputer. Other configuration settings were set by setting up configuration files within the general storage space of the microcomputer. While microcomputers have been designed to include non-volatile configuration information storage areas which are generally set up just once by a user, newer computers are taking fuller advantage of this concept. Examples of information within such a storage area includes the type of hardware in a slot (that is, attached to a backplane 412 as shown in FIG. 4) of the microcomputer and what portions of reserved memory should be shadowed.

The above-noted use for the present invention, particularly with reference to configuration information of hardware attached to the backplane 412, is now described with reference to FIG. 4. Referring to FIG. 4, the present invention, shown by 114, is part of the basic input/output system (BIOS) 402 of the microcomputer 100. When any one of the hardware devices within a slot on the backplane 412 (referred to herein as cards 408) are added to the backplane 412, a user need to execute a configuration utility. This causes the memory allocation routine 114 to write configuration information into a CMOS memory 406, indicative of the type of card being placed on the backplane 412. The configuration information is written in memory by the memory allocation routine 114 in accordance with the scheme noted above. If the empty slot 418 were to remain empty, then in the embodiment of the present example, an empty block with a pointer would be created as a kind of place marker, designating that this is where the configuration information would go, should there be any later. Of course, it should be understood that the present invention is not limited for use in managing memory in a configuration information environment.

It should be understood that present invention is not limited to its preferred embodiments, and that the examples presented above are merely for the purposes of illustration. The scope of the present invention should therefore be interpreted by the following claims as defined by the forgoing figures and text.

What is claimed is:

1. A computing system comprising:
    a data memory area, having a first end and a second end, the data memory area containing a pointer table, the pointer table containing at least one data pointer and the pointer table being at the first end of said data memory area;
    first means for obtaining from said pointer table a next available data memory location for placement of a data block within a data field, where said data field begins from said second end of said data memory area;
    second means for, upon placement of the data block within the data field, placing in the pointer table a new data pointer which indicates a new next available data memory location for placement of a next data block within the data field; and
    an overlap means responsive to said first means and said second means for determining whether a placing of said data block in said data field and a placing of the new data pointer in said pointer table would cause said data field and said pointer table to overlap and not placing said data pointer and said data block within said data memory if by doing so they were to overlap as determined by said overlap means;
    where said pointer table and said data field grow towards each other from said first end and said second end, respectively, of said data memory area.

2. The computing system of claim 1, wherein said data memory area comprises CMOS memory.

3. The computing system of claim 1, wherein the first means comprises a free pointer index containing an address of a data pointer in said pointer table having said next available data memory location.

4. The computing system of claim 1, wherein said data block of said second means can vary in length from a minimum length equal to zero bytes to a maximum length equal to said data memory area length less a memory length required by two pointers.

5. A method for placing data blocks within a data memory area of a computing system, the method comprising the steps of:
    (a) placing within the data memory area an expandable pointer table containing data pointers, beginning from a first end of a data memory area;
    (b) performing the following substeps to add a new data block to the data memory area:
        (1) obtaining from said pointer table an address of an available data memory location which is closest to a second end of said data memory area;
        (2) determining whether said new data block and said pointer table will overlap if said new data block and a new data pointer are written to the data memory area and performing steps (3) and (4) only if no overlap will occur;
        (3) writing said new data block at the available data memory location; and
        (4) writing said new data pointer in said pointer table containing an address of a new available data memory location which is closest to the second end of the data memory area wherein the new available data memory location is contiguous with the location of the new data block within the data memory area.

6. The method of claim 5, wherein substep (3) includes writing the new data block to a non-volatile CMOS memory.

7. The method of claim 5, wherein substep (1) includes accessing a free pointer index containing an address of a data pointer in said pointer table having the available data memory location.

8. The method of claim 5, wherein substep (3) includes writing the new data block such that the new data block has zero length.

* * * * *